Aug. 30, 1932.  T. H. SIMMONS  1,874,819
MINIATURE THEATER
Filed May 8, 1931       2 Sheets-Sheet 1

Inventor
Thomas H. Simmons
By
Attorney

Aug. 30, 1932.  T. H. SIMMONS  1,874,819
MINIATURE THEATER
Filed May 8, 1931   2 Sheets-Sheet 2
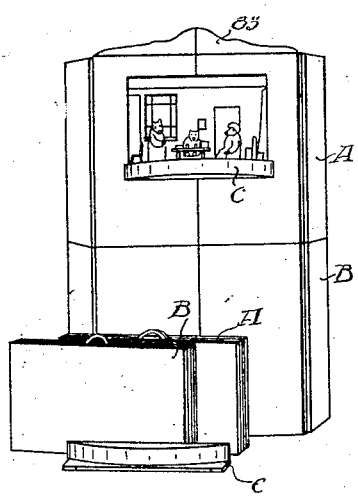
Fig.4
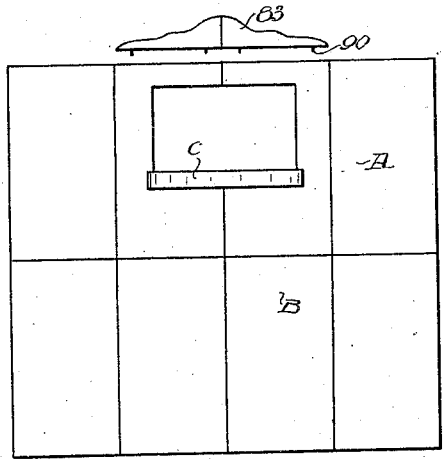
Fig.5
Fig.6
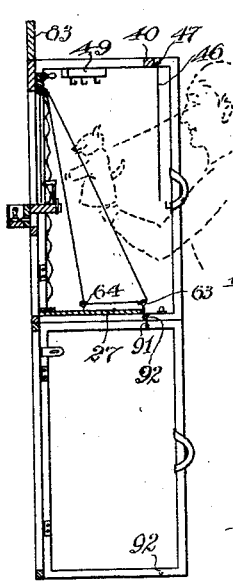
Fig.7
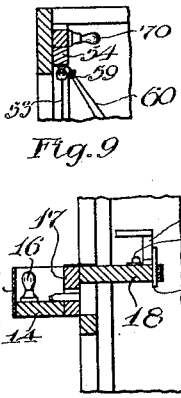
Fig.9
Fig.10
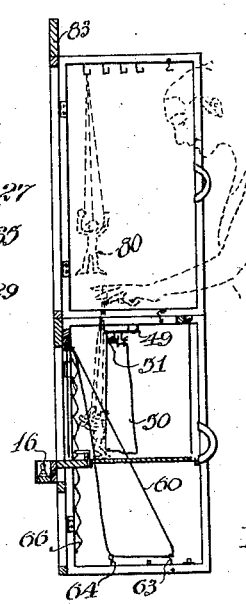
Fig.14
Fig.8
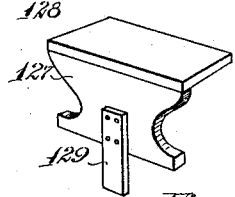
Fig.11
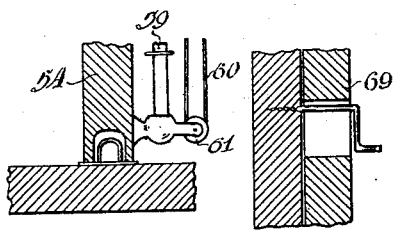
Fig.12   Fig.13
Inventor
Thomas H. Simmons
By 
Attorney Patented Aug. 30, 1932

1,874,819

UNITED STATES PATENT OFFICE

THOMAS H. SIMMONS, OF ST. PAUL, MINNESOTA

MINIATURE THEATER

Application filed May 8, 1931. Serial No. 535,908.

The present invention relates to a miniature theater for use with hand puppets or marionettes.

The art of puppetry is an extremely ancient one, and puppets have been used in most of the countries of the world for centuries. However, in spite of the long continued and widespread use of hand puppets and marionettes, little advance has been made in the art of either, except in refinements in the figures themselves and in the means of manipulating them.

An object of the present invention is to make an improved miniature theater.

In order to attain this object, there is provided, in accordance with one feature of the invention, a pair of foldable frame structures adapted to be mounted one upon the other, one of the foldable frame structures having a stage opening therein and the frames being so constructed that either may be placed in superposed position above the other and secured in such position.

When the foldable frame having the stage opening therein is placed above the other frame structure, the device is adapted for use as a hand puppet theater, while, when the frame having the stage opening therein is placed below the other, the device is adapted for use as a marionette theater. In either case, the frame not provided with the stage opening serves to mask the body of the operator from the audience.

The foldable frames are preferably constructed with shallow wall recesses in which various accessories are arranged and securely housed when the structure is folded for storage or transportation.

These and other features of the invention will be more fully brought out in the following description and the accompanying drawings, wherein:

Figure 4 is a view in perspective of the front of a theater, embodying the present invention, as set up and in use as a hand puppet theater and also shows the two frames which comprise the theater, folded, and a footlight housing and stage floor member folded for storage or transportation.

Figure 5 is a view in front elevation of the superposed frames in extended position, showing an ornamentally curved top member raised slightly from its normal position to show means for fastening this member to the top of the framework.

Figure 6 is a top edge view of one of the foldable frames, showing the hinge arrangement by which it is folded.

Figure 7 is a vertical, sectional view through the theater, set up for use as a hand puppet theater, an operator, holding a puppet in operative position, being indicated in dotted lines.

Figure 8 is a view similar to Figure 7, showing the theater set up for use with marionettes, an operator being also indicated in this view in dotted lines.

Figure 9 is an enlarged sectional view on the line 9—9 of Figure 3.

Figure 10 is an enlarged sectional view on the line 10—10 of Figure 3.

Figure 11 is a view in perspective of a piece of theatrical property showing a strip connected to the rear thereof for mounting said property in a slotted opening in the stage floor.

Figure 12 is an enlarged sectional view through one end of a curtain support member showing a method of securing the curtain support member in the frame when not in use.

Figure 13 is a sectional view through a lighting strip support member when secured in the frame for storage or transportation, showing an offset screw which is used to removably secure the strip in this position; and Figure 14 is a sectional view of a modified form of frame section.

Figure 1:
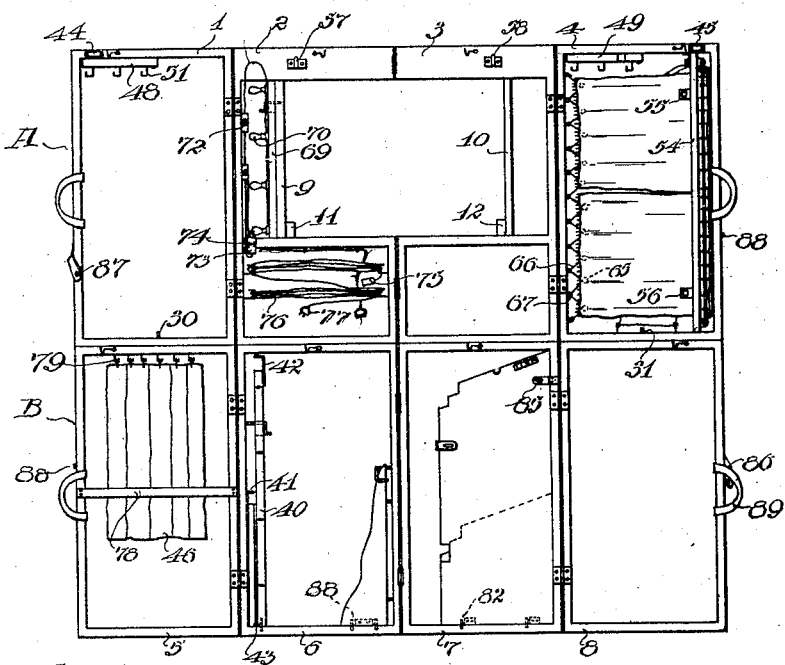
Figure 1 is a rear view of two superposed, foldable frame structures in extended position showing various accessories housed therein.
Figure 2:
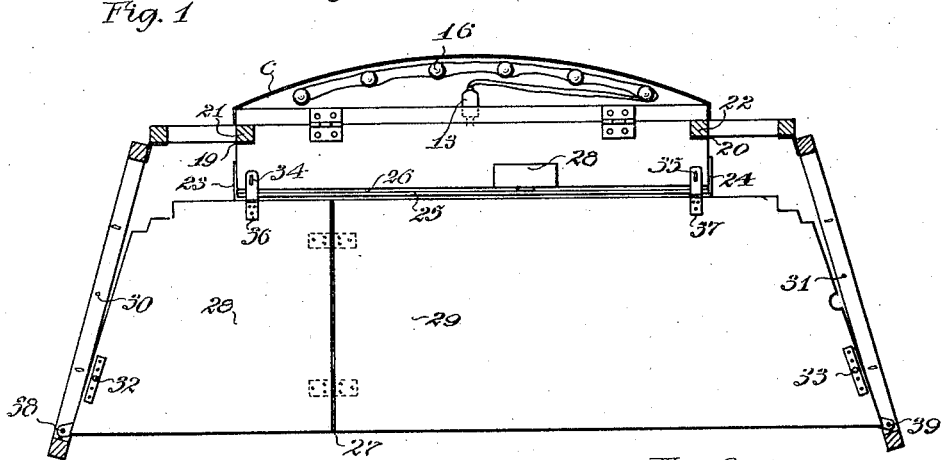
Figure 2 is a horizontal sectional view through the stage opening of the device when arranged as illustrated in Figure 8 for the use of marionettes.

Referring to the drawings in detail, a pair of foldable frame members A and B are each constructed of a plurality of frame sections, hingedly connected together so as to be foldable, one upon the other. The foldable frame A comprises frame sections 1, 2, 3, and 4, and the frame structure B also comprises four sections 5, 6, 7, and 8. All of the sections of both frames A and B, except the two center sections 2 and 3 of the frame A, are constructed in the form of rectangular frames having longitudinal side members and transverse end members, preferably of light, strong construction. These rectangular frames are covered on their outer sides by a substantially opaque material such as duck. The construction of these frames is not material to the invention, however, and it would be feasible to construct these frame members of sheet metal with inturned channeled edges, as indicated at 1a in the modified form shown in Figure 14.

The two central sections of the frame A are constructed with complementary, rectangular notches 9 and 10 therein, to form a stage opening. A pair of blocks 11 and 12 are permanently mounted, one in each of the lower corners of the stage opening, to support a stage floor and footlight housing member C in raised position from the lower edge of the stage opening, so as to permit the insertion in this opening of an electrical contact plug 13 by means of which the footlights may be connected to a source of electrical current.

The combined stage floor and footlight housing member C comprises a bottom member 14 which may be of wood, having a curved outer edge and with a piece of sheet material 15, secured around its curved outer edge to extend upwardly therefrom to mask the rays of footlights 16 from the audience and to act as a reflector to direct the rays of the footlights into the stage opening. The straight, rear edge of the bottom member 14 is secured to a vertical member 17. A stage floor member 18 is hingedly connected to the upper edge of the vertical member 17 and the floor member 18 is preferably notched out as at 19 and 20 to receive vertical frame members 21 and 22 therein to secure the member C against displacement in the frame. A pair of metal angle members 23 and 24 are secured to the rear corners of the stage floor 18 and a strip 25 which is preferably of hardwood is secured interiorly of these angle members to extend across the rear edge of the stage floor in spaced relation therefrom. This provides an elongated, slotted opening 26 across the entire rear edge of the stage floor. Various pieces of stage property, which may be employed, are constructed with means extending downwardly therefrom to enter the slotted opening. A table constructed in this manner is indicated in Figure 11. The table, comprises a base portion 127 and a top portion 128. The base 127 has secured thereto a downwardly projecting strip 129 of a thickness to be frictionally engaged by the sides of the slot 26 when inserted therein.

When the device is used for hand puppets, a shelf 27, made in two sections 28 and 29, hingedly connected together to permit folding this member for storage in one frame section, is mounted transversely across the lower portion of the frame member A. The foldable shelf is cut out at its forward corners and center to fit around the frame members at the two forward angles and center of the frame A. A pair of pins 30 and 31, see Figure 1, are mounted in the side sections of the frame A and a pair of openings 32 and 33 are provided in the sides of the shelf 27 to fit over these pins and support the shelf and to firmly brace the frames A and B in position.

When the device is to be used for marionettes, this shelf 27 is mounted rearwardly and in horizontal alinement with the upper surface of the stage floor 18 to form an extension of said floor. A pair of staples 34 and 35 are provided on the rear corners of the upper surface of the stage floor and a pair of hasps 36 and 37 are mounted on the forward edge of the shelf 27 to fit over these hasps as one means to secure the forward edge of the member 27 in position. When used thus, the rear corners of the member 27 are secured to hooks 38 and 39 on the rear vertical frame members of the sections 1 and 4, which hooks are engaged by extended hasps as one means of effecting support for the shelf 27.

A transverse bracing member 40 is provided with angle members 41 and 42 of metal, mounted one on each end thereof. This bracing member is hinged as at 43 to permit inserting it in one of the frame sections for housing. The end portions of the angle members 41 and 42 are spaced outwardly from the ends of the bracing member 40 sufficiently to receive the upper edges of the sections 1 and 4 therein. A pair of metal securing strips 44 and 45, adapted to receive the ends of the angle members 41 and 42, are mounted, one near each of the rear upper corners of sections 1 and 4.

When the device is used as a marionette theater, this frame member is mounted with the angular bent end members 41 and 42 of the bracing strip 40, inserted in the securing strips 44 and 45, while, when used for a hand puppet theater, the angular bent end members 41 and 42 are placed over the upper edge of the sections 1 and 4 to receive the upper edges of these sections between the outer end of the bracing member 40 and the angle members 41 and 42. In addition to acting as a bracing member, the member 40 provides a support for a removable back drop 46. The bracing member 40 is provided with hooks 47 and the back drop may be provided with suspension rings 48 along its upper edge, so that the drop may be supported by these hooks when in use. This back drop is preferably made of a semi-transparent material, such as cloth, which will permit the operator, when the device is used for hand puppets, to discern the figures of the puppets through the drop, while the drop at the same time masks the operator from the view of the audience. This is better accomplished by giving the performance in a dimly lighted room. The stage lighting illuminates the figures and the front of the drop and permits the operator to see through the back drop, while the operator, being in a dim or unlighted area, is concealed from the spectators by the drop.

A pair of pivotally mounted wing drop support members 48 and 49 are provided to support wing drops 50 when the theater is used for marionettes. These wing drop support members are provided with hooks 51 projecting downwardly from their lower surface and the wing drops are provided with rings along their upper edges to be engaged by these hooks. When not in use the wing drop supports may be folded back into the frame.

Figure 3:
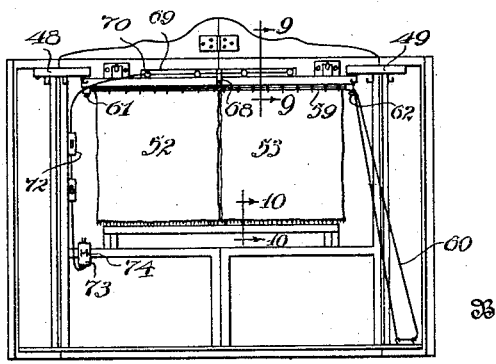
Figure 3 is a rear elevation of one frame structure of the device as used for hand puppets, a semi-transparent back drop and a transverse top bracing member being removed to more clearly display the construction of the device.

Curtains 52 and 53, see Figure 3, are mounted upon a support member 54 which is provided with two supporting eyelets 55 and 56 which are adapted to engage hooks 51 and 58 mounted above the stage opening. The curtains 52 and 53 are provided with rings on their upper edges which are slidably mounted upon a rod 59, mounted transversely below the support member 54. A curtain operating cord 60 is mounted on pulleys 61 and 62, the pulley 62 being of double roller construction so as to receive both runs of the curtain operating cord, while the pulley 61 is of single roller construction, the cord being looped around this pulley. The curtain operating cord is passed around hooks 63 and 64. The supporting rings of each of the curtains 52 and 53 nearest the center of the stage opening are secured one to each run of the cord, so that upon pulling the cord in one direction, the curtains are opened and on pulling it in the opposite direction, the curtains are closed. Other methods of operating theater curtains may be used, if desired. Each of the curtains is provided with a plurality of buttons 65 along the inside of the lower edge thereof, these buttons preferably being of lead so as to weight the curtains. A resilient band 66 which may be of elastic cord, is threaded through eyelets 67 mounted along one of the vertical edges of the section 4. When the curtain is in use over the stage opening, this elastic cord remains in the position illustrated in Figure 7, while, when the curtain is stored in the frame, this cord is looped over the buttons on the the lower edges of the curtains to hold the curtains in outstretched position within the frame recess and prevent wrinkling of the curtains. The curtain support member 54 is provided with a metal clip 68 secured to its outer face and positioned to extend upwardly therefrom when the curtain is mounted for use, as illustrated in Figure 3.

A lighting strip 69, preferably of the same thickness as the curtain support member 54, is provided with a plurality of electric light sockets 70 with electric lamps mounted therein. The lighting strip is shown in Figure 1 secured in the frame for storage or transportation, while in Figures 3 and 9 it is shown mounted in operative position above the curtain support strip 54, being held in position thereon by the clip 68. A flexible conductor 71 is connected from the lighting strip to a switch 72 and this switch is in turn connected to contact member 73. The contact member is also connected to a switch 72a which is connected by a conductor 72b to a plug 72c which is adapted to be connected to the plug 13, which is in turn connected to the footlights. A plug 75 adapted to be connected to the member 73 is connected to a long, flexible conductor cord 76 having a socket plug 77 at its other end. This socket plug 77 may be plugged into a wall or other receptacle to energize the overhead and footlights. Any other suitable method of electrically connecting the overhead and footlights to a source of electrical current may be used.

A strip 78 of resilient material, such as elastic webbing is mounted across the section 5 to retain backdrops and wing drops therein. Hooks 79 projecting forwardly are provided at the upper end of this section, from which to hang the drops. These hooks also serve to support marionettes 80 when not in use, as illustrated in Figure 8, when the device is in use as a marionette theater.

Pins 81 and 82 are mounted in the sections 6 and 7. These pins are adapted to be inserted between the folded portions of an ornamental curved top structure 83 and the folded portions of the member 27 when these parts are housed in the frame. A hook 84 which is mounted to swivel in the side of the section 6 retains the upper end of the ornamental top member 83, while a hasp 85 is adapted to overlie the member 27 and secure it in position within the frame.

Straps 86, which may be of fabric webbing, are connected one to each of the sections A and B, respectively. These straps are provided with snap fasteners 87 which are adapted to engage posts 88 on the opposite side of each frame to secure the respective frames in folded position, as illustrated in Figure 4. Carrying straps 89 which may also be of fabric webbing are secured to the outer sections of both the foldable frames A and B.

The foldable ornamental top section 83 is provided with pins 90 projecting downwardly therefrom, which are adapted to enter openings 91 in the upper edge of either the frames A or B, depending on whether the device is to be used as a hand puppet or a marionette theater.

Hooks 91 are provided on the upper end of each section, of each of the frames, and pins 92 are mounted on the lower end of each section, so that the frames may be hooked together in superposed position with respect to each other, with either of the frames uppermost. The theater when folded is light and compact and is readily set up and carries, housed within itself, all of the necessary accessories for either a hand puppet or a marionette theater.

It has previously been customary in using hand puppets for the operator or puppeteer to stand below the stage opening and operate the puppets above his head. The structure of the present theater and the use of a semi-transparent back drop makes it possible for the puppeteer to operate the puppets before him in a natural, comfortable position and to accurately observe and better control his own movements of the puppet figures.

I claim:

1. A miniature theater having a stage opening therein, comprising a plurality of hingedly connected frame sections, each of said sections being constructed in the form of a shallow receptacle to house theatrical accessories therein, and a stage floor removably mounted across the lower edge of said stage opening.

2. A miniature theater having a stage opening therein, comprising a plurality of frame sections hingedly connected together to fold into superposed relation with respect to each other, a stage floor removably mounted across the lower edge of said stage opening, and a troughed footlight housing member mounted forwardly of the forward edge of said stage floor.

3. A miniature theater having a stage opening, therein comprising a plurality of recessed frame sections, a curtain support member removably mounted across the upper edge of said stage opening, a curtain mounted thereon and movable to form a closure across said stage opening, and fastening means adapted to removably secure said curtain support member and said curtain within one of said recessed sections.

4. A miniature theater having a pair of foldable frames, one of said frames having a stage opening therein, and means to connect said frames together in superposed, edgewise position.

5. A miniature theatre having a foldable frame, with a stage opening therein, a footlight housing member mounted across the lower edge of said stage opening, and a stage floor member hingedly connected to said footlight housing member and foldable over said footlight housing member.

6. A miniature theatre comprising a pair of foldable frames, one of said frames having a stage opening therein, and means adapted to connect said frames together in superposed, edgewise position with either of said frames uppermost.

7. In a miniature theatre, a foldable frame having a stage opening therein, a stage floor member mounted adjacent the lower edge of said stage opening, said stage floor having a slotted opening therein, adapted to receive a downwardly projecting portion of a piece of stage property.

8. In a miniature theatre, a stage, a stage floor member terminating short of the rear of said stage, and a resilient strip spaced rearwardly from the rear edge of said stage floor member and adapted to receive a downwardly projecting portion of a piece of stage property therein.

9. In a miniature theatre, a foldable frame having a stage opening therein and having a plurality of recesses in the wall thereof, adapted to receive a plurality of theatrical accessories removably housed in said recesses, and supported means adapted to support theatrical accessories in operative position on said frame.

10. In a miniature theatre, a frame adapted to mask the body of an operator, a stage opening in said frame, and a semi-transparent back drop positioned rearwardly of said stage opening and forwardly of the position occupied by the body of an operator to mask the body of said operator from an audience to permit said operator to view an object positioned forwardly of said semi-transparent drop and rearwardly of said stage opening.

In testimony whereof I affix my signature.

THOMAS H. SIMMONS.